US007586630B2

(12) United States Patent
Shimizu

(10) Patent No.: US 7,586,630 B2
(45) Date of Patent: Sep. 8, 2009

(54) PRINT PREVIEW APPARATUS AND METHOD

(75) Inventor: Katsuhisa Shimizu, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 931 days.

(21) Appl. No.: 10/790,870

(22) Filed: Mar. 3, 2004

(65) Prior Publication Data
US 2004/0205641 A1   Oct. 14, 2004

(30) Foreign Application Priority Data
Mar. 25, 2003   (JP) .......................... P2003-083530

(51) Int. Cl.
*G06F 3/12* (2006.01)

(52) U.S. Cl. .................... 358/1.13; 358/1.16; 345/581

(58) Field of Classification Search ................ 715/513, 715/526, 807; 345/658, 581; 358/1.1–1.9, 358/1.11–1.18
See application file for complete search history.

(56) References Cited

U.S. PATENT DOCUMENTS

| | | | |
|---|---|---|---|
| 5,381,163 A * | 1/1995 | Yokoyama | 345/658 |
| 5,652,901 A | 7/1997 | Slayden et al. | |
| 5,764,227 A * | 6/1998 | Ishimine | 715/807 |
| 5,781,785 A * | 7/1998 | Rowe et al. | 715/513 |
| 2003/0147097 A1 | 8/2003 | Kotani et al. | |
| 2004/0010756 A1* | 1/2004 | Hobbs | 715/526 |

FOREIGN PATENT DOCUMENTS

| | | |
|---|---|---|
| JP | 3-201024 | 9/1991 |
| JP | 5-181635 | 7/1993 |
| JP | P2001-10153 A | 1/2001 |
| JP | 2002-55803 | 2/2002 |
| JP | P2002-55803 A | 2/2002 |
| JP | P2003-231323 A | 8/2003 |

* cited by examiner

*Primary Examiner*—King Y Poon
*Assistant Examiner*—Lennin R Rodriguez
(74) *Attorney, Agent, or Firm*—McDermott Will & Emery LLP

(57) ABSTRACT

The print preview screen has a button enabling the operator to select the direction in which previewed pages are offset. The print preview screen also has a display screen enabling the operator to specify which sheet is displayed in the foreground in front of all other sheets, which sheet is displayed in the background behind all other sheets, and the offset distance between the stacked sheets. The following process is then repeated for each sheet based on these operator specifications. Data for one sheet is written to a 1-sheet display buffer (30). Data for areas not displayed is then erased from the 1-sheet display buffer (30). The data in the 1-sheet display buffer (30) is then transferred to the display data memory (40).

9 Claims, 17 Drawing Sheets

CLICK

Fig. 7

| SHEET | PRINT DATA | OFFSET |
|---|---|---|
| 1 | pg1、pg2 | (0、0)、(0、100) |
| 2 | pg3、pg4 | (0、0)、(0、100) |
| 3 | pg5、pg6 | (0、0)、(0、100) |
| 4 | pg7、pg8 | (0、0)、(0、100) |
| ⋮ | ⋮ | ⋮ |

Fig. 13
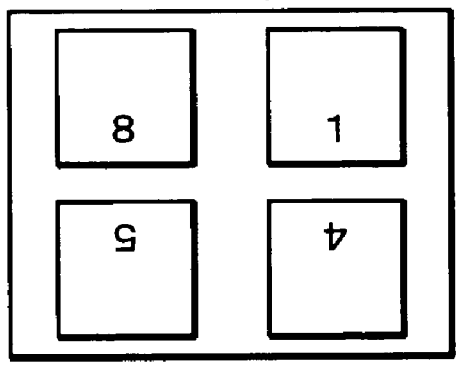
SHEET 1 (FRONT)
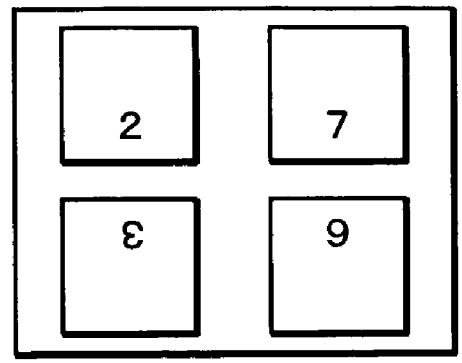
SHEET 1 (BACK)
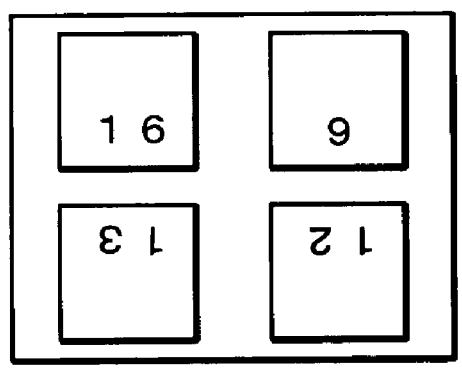
SHEET 2 (FRONT)
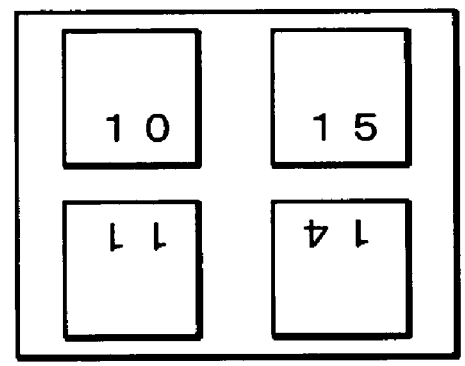
SHEET 2 (BACK)

Fig. 15

| SHEET | SIDE | PRINT DATA | OFFSET |
|---|---|---|---|
| 1 | FRONT | pg1、pg4 | (0、0)、(0、100) |
| 1 | BACK | pg2、pg3 | (0、0)、(0、100) |
| 2 | FRONT | pg5、pg8 | (0、0)、(0、100) |
| 2 | BACK | pg6、pg7 | (0、0)、(0、100) |
| ⋮ | ⋮ | ⋮ | ⋮ |

PRINT PREVIEW APPARATUS AND METHOD

BACKGROUND OF THE INVENTION

1. Field of the Invention

The present invention relates generally to a display system for displaying a print image on screen, and relates especially to a display system disposed to a digital printer controller.

2. Description of the Related Art

Digital printing systems basically consist of a digital printer for outputting printed material (referred to as the "printout" below), a controller for the digital printer (referred to as simply the "controller" below), and a front-end computer for creating the data from which the printout is produced. The controller typically has a computer unit, input devices such as a keyboard, a mouse and so on, an auxiliary storage such as a hard disk for storing programs and data for printing, and a display device such as a liquid crystal display or CRT display. Using the front-end computer of this digital printing system, the user first compiles the text, drawings, symbols, photographs, pictures, and other information to create the data from which the printout is generated. This data is referred to as the "layout data" below. This layout data is then sent to the controller via a network. The layout data is then rasterized by the controller and converted to a bitmap image data format ("print data" below) that can be printed from the digital printer.

However, before the digital printer prints on paper, the print layout is typically confirmed by displaying a virtual representation of the printout on the display device in a so-called "print preview screen" by means of a "print preview" function. See, for example, Japanese Published Patent Applications 2001-10153 and 2002-55803. If the document to be printed contains more than one page, the printout is presented one page at a time on the print preview screen. There are various ways to change the previewed page, such as clicking buttons for showing the next or previous page with mouse, or dragging a scroll bar icon with mouse to change the displayed page continuously. The print preview screen may also have a page number input box so that the user can enter a particular page number and turn to the specified page.

A problem with this print preview screen, however, is that because the printout is presented one page at a time, multiple pages cannot be displayed at the same time so that the print layout can be confirmed while comparing the different pages. When the page number is to be printed in a specific position on each page of the printed document, for example, it is difficult to confirm if the position where the page number is printed varies on different pages because multiple pages are not displayed simultaneously in the print preview screen. It is also difficult to confirm from the print preview screen whether the print margins around the printing area of each page are the same on every page.

To solve these problems print preview screens that can simultaneously display multiple pages of the printed document, and print preview screens that display facing pages containing multiple pages on one sheet, are also known.

A problem with these print preview screens, however, is that when many pages are displayed simultaneously in the same screen, the per-page display area on screen becomes smaller and the text and others are reduced in size. As a result, comparing the print layout of each page is still not easy even though multiple pages are displayed simultaneously on the same screen. Furthermore, when consecutive pages are displayed with the screen split vertically so that the pages are shown in the top and bottom of the screen, the bottom part of one page and the top part of the next page can be easily compared because they appear adjacent on screen. The bottom of one page and the bottom of the next page cannot be easily compared, however, because they appear in non-adjacent areas on screen.

SUMMARY OF THE INVENTION

An object of the present invention is therefore to provide a print preview screen enabling easy comparison of a specific part of the printing layout in an area of the page desired by the operator over multiple different pages.

To achieve this object, a first aspect of the present invention is an apparatus for print preview which presents printout before printing by the digital printer. The apparatus for print preview comprises a display portion; a display data storage portion for storing display data representing content to be displayed on the display portion; a print data storage portion for storing print data to be printed by the digital printer; and a display control portion for transferring and storing print data corresponding to the printout to be displayed as the print preview from the print data storage portion to the display data storage portion, and thereby presenting the printout on the display portion. The display control portion stores print data corresponding to a plurality of sheets of printout to the display data storage portion while offsetting the storage address for each sheet of print data. The display portion presents printout for the plurality of sheets in parallel offset positions page by page based on data stored in the display data storage portion by the display control portion.

According to this configuration, when a printed document will be printed on plural sheets of paper, each of the printed sheets can be displayed on a display portion with the four corners of each sheet offset from the other sheets. The print layout in a specific area of each sheet can therefore be easily compared for the plurality of sheets.

The display control portion of this apparatus for print preview preferably prevents transferring to the display data storage portion the part of print data representing the plurality of sheets of printout that is print data corresponding to an area located behind another sheet as a result of stacking the plurality of sheets.

According to this configuration, the amount of data, that is transferred when the print preview screen is presented, is reduced, and thereby the load on the apparatus when the print preview screen is displayed is also reduced.

This apparatus for print preview further preferably comprises a first input operation portion for receiving input specifying one or multiple sheets to be presented in an offset display on the display portion; a second input operation portion for receiving input specifying an offset distance for the sheets to be presented in the offset display; and a third input operation portion for receiving input specifying an offset direction for the sheets to be presented in the offset display. The display control portion stores print data corresponding to the printout of the one or multiple sheets in the display data storage portion while shifting the data storage address of each sheet based on the offset distance and offset direction set according to the input received by the first input operation portion, second input operation portion, and third input operation portion. The display portion displays the printout of the one or multiple sheets in a stacked arrangement with each sheet shifted the offset distance in the offset direction according to the input received by the first input operation portion, second input operation portion, and third input operation portion.

According to this configuration, when a printed document is printed on plural sheets of paper, each of the printed sheets can be displayed on the display portion with the four corners of each sheet offset from the other sheets in accordance with the input by the operator. The print layout in a specific area of each sheet desired by the operator can therefore be easily compared for the plurality of sheets.

Yet further preferably, the apparatus for print preview also comprises a fourth input operation portion for receiving input specifying a sheet to be presented in the foreground on the display portion. When input specifying a sheet to be presented in the foreground is received, the display control portion overwrites print data corresponding to the printout of the specified sheet in the display data storage, and the display portion presents the specified sheet in the foreground.

According to this configuration, the operator can specify a particular sheet on the screen displaying a preview of the printout, and the sheet specified by the operator can be displayed on top in the foreground of the display. The operator easily allows the display portion to display a desired sheet in the foreground.

Another aspect of the present invention is a printout display method of an apparatus for print preview where the apparatus comprises a display portion, a display data storage portion for storing display data representing content to be displayed on the display portion, and a print data storage portion for storing print data. The printout display method comprises a storage address calculating step of calculating an offset storage address in the display data storage portion for each sheet of print data for a plurality of sheets where the print data is correspond to the printout to be displayed as the print preview; a data transfer step of transferring and storing data stored in the print data storage portion to the display data storage portion based on the storage addresses calculated in the storage address calculating step; and a display step of presenting printout for the plurality of sheets in parallel offset positions on the display portion based on the data stored in the display data storage portion in the data transfer step.

Preferably, the data transfer step of this printout display method prevents transferring to the display data storage portion the part of print data representing the plurality of sheets of printout that is print data corresponding to an area located behind another sheet as a result of stacking the plurality of sheets.

Yet further preferably, this printout display method also comprises a first input receiving step of receiving input specifying one or multiple sheets to be presented in an offset display in the display step; a second input receiving step of receiving input specifying an offset distance for the sheets to be presented in the offset display; and a third input receiving step of receiving input specifying an offset direction for the sheets to be presented in the offset display. In the data transfer step, the print data corresponding to the printout of the one or multiple sheets is stored in the display data storage portion while the data storage address of each sheet is shifted based on the offset distance and offset direction set according to the input received in the first input receiving step, second input receiving step, and third input receiving step. In the display step, the printout of the one or multiple sheets is displayed in a stacked arrangement with each sheet shifted the offset distance in the offset direction according to the input received in the first input receiving step, second input receiving step, and third input receiving step.

Yet further preferably, this printout display method also comprises a step of receiving input specifying a sheet to be presented in the foreground in the display step. When input specifying a sheet to be presented in the foreground is received, print data corresponding to the printout of the specified sheet is overwritten in the data transfer step and the specified sheet is presented in the foreground in the display step.

A further aspect of the present invention is a program for displaying printout in an apparatus for print preview and having a display portion, a display data storage portion for storing display data representing content to be displayed on the display portion, and a print data storage portion for storing print data. This printout display program, when executed by a computer, causes the computer to perform a storage address calculating step of calculating an offset storage address in the display data storage portion for each sheet of print data for a plurality of sheets where the print data is correspond to the printout to be displayed as a print preview; a data transfer step of transferring and storing data stored in the print data storage portion to the display data storage portion based on the storage addresses calculated in the storage address calculating step; and a display step of presenting printout for the plurality of sheets in parallel offset positions on the display portion based on the data stored in the display data storage portion in the data transfer step.

Preferably, the data transfer step of this program prevents transferring to the display data storage portion the part of print data representing the plurality of sheets of printout that is print data corresponding to an area located behind another sheet as a result of stacking the plurality of sheets.

Yet further preferably, this program, when executed by a computer, causes the computer to perform a first input receiving step of receiving input specifying one or multiple sheets to be presented in the offset display in the display step; a second input receiving step of receiving input specifying an offset distance for the sheets to be presented in the offset display; and a third input receiving step of receiving input specifying an offset direction for the sheets to be presented in the offset display. In the data transfer step, the print data corresponding to the printout of the one or multiple sheets is stored in the display data storage portion while the data storage address of each sheet is shifted based on the offset distance and offset direction set according to the input received in the first input receiving step, second input receiving step, and third input receiving step. In the display step, the printout of the one or multiple sheets is displayed in a stacked arrangement with each sheet shifted the offset distance in the offset direction according to the input received in the first input receiving step, second input receiving step, and third input receiving step.

Yet further preferably, this program, when executed by a computer, causes the computer to perform a step of receiving input specifying a sheet to be presented in the foreground in the display step. When input specifying a sheet to be presented in the foreground is received, print data corresponding to the printout of the specified sheet is overwritten in the data transfer step and the specified sheet is presented in the foreground in the display step.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows the basic print document parameters in the first embodiment of the present invention;

FIG. 13 shows an example of a imposition print in the second embodiment of the present invention;

FIG. 15 shows the basic print document parameters in the second embodiment of the present invention;

DESCRIPTION OF THE PREFERRED EMBODIMENTS

Preferred embodiments of the present invention are described below with reference to the accompanying figures.

The following terms are used herein as defined below.

When there is a stack of multiple sheets, the "n-th" sheet refers to the n-th sheet of paper counted sequentially from the first sheet on the top of the stack.

When the operator uses a mouse or other input device to select a button or the like presented on the screen of the display device, the operator is said to "click" the button or other icon.

1. First Embodiment

1.1 General Configuration

Figure 2:
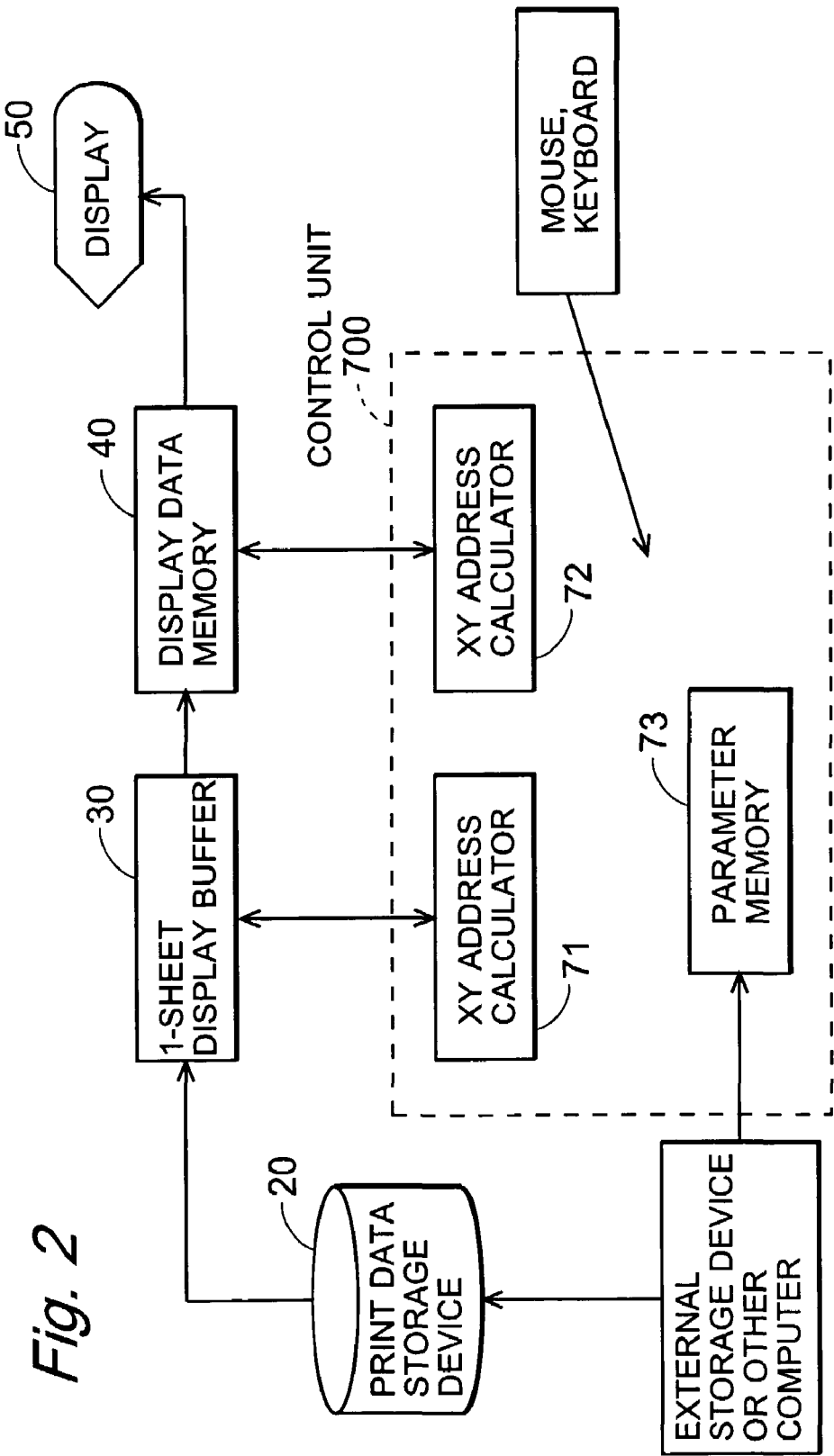
FIG. 2 is a block diagram showing the general configuration of the digital printer controller in the first embodiment of the present invention.

FIG. 2 is a block diagram showing the general configuration of the digital printer controller in the first embodiment of this invention. As shown in the figure this controller has a print data storage device 20 for storing print data, a 1-sheet display buffer 30 for storing one sheet of print data read from the print data storage device 20, a display device 50 such as a liquid crystal display or CRT etc., display data memory 40 for storing data representing the printed content displayed in the print preview screen on the display device 50, control unit 700 including a CPU and RAM(Random Access Memory), and input devices such as a mouse, or a keyboard.

The control unit 700 has XY address calculators 71 and 72, and parameter storage portion 73. XY address calculator 71 calculates the storage address of the data to be displayed in the 1-sheet display buffer 30. XY address calculator 72 calculates the address where data read from 1-sheet display buffer 30 is to be stored in the display data memory 40. The parameter storage portion 73 stores the print settings.

The print data stored in the print data storage device 20 is read from an external storage device, sent from a computer called a front-end computer, or created with the control unit 700.

A print preview screen is presented on the screen of the display device 50 in response to the instruction of the operator. Displaying plural sheets on the display device 50 with the sheets overlapping the other sheets with the four sides of each sheet parallel to the other sheets is referred to herein as a "stacked display."

1.2 Operating Screen

A typical operating screen used by the operator in the present embodiment is described next. The document to be printed has ten pages and is printed with two pages on each sheet of paper in the following embodiment. The CPU controls the display screen in response to operator actions.

Figure 3:
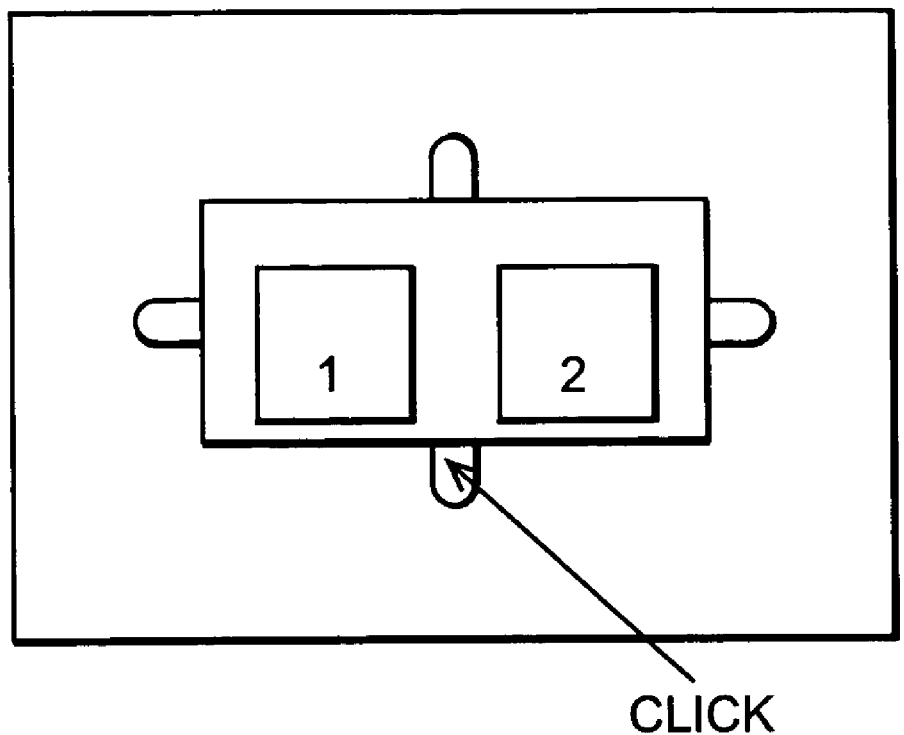
FIG. 3 shows a print preview screen displayed first when a print preview is selected in the first embodiment of the present invention.
Figure 4:
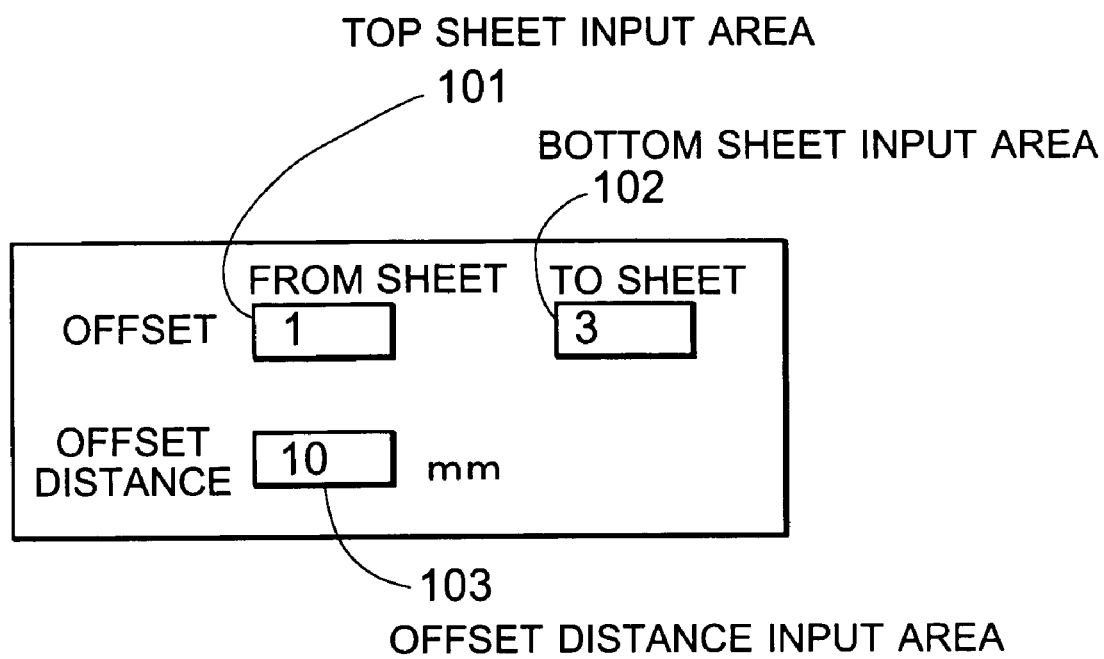
FIG. 4 shows a screen for entering display parameters for the stacked display in the first embodiment of the present invention.

When the operator selects the print preview, the display screen such as shown in FIG. 3 is presented on the display device 50. This is the first print preview screen presented when the print preview is selected. The document is printed on five sheets of paper in this example, but the four corners of the five sheets are aligned with no offset therebetween in this initial print preview screen. Only the first sheet is therefore visible at this time. Note that the numbers 1 and 2 in FIG. 3 denote the page numbers printed on the respective pages, thus indicating that the first and second pages of the document are printed on the first sheet of paper. Tabs with two parallel sides and a semicircle at the outside end is formed on each of the four sides of the print preview screen around the outside of the sheets. These tabs are referred to herein as "stacking buttons." The shape of the stacking buttons shall not be limited to that shown in FIG. 3. Clicking one of these stacking buttons displays a display parameter input screen such as shown in FIG. 4. It is assumed that the stacking button of the lower portion was clicked.

The display parameter input screen has a top sheet input area 101, bottom sheet input area 102, and an offset distance input area 103. The display parameter input screen enables the operator to specify the settings for shifting the document sheets from the presentation shown in FIG. 3 in which the four corners of each sheet are precisely aligned to the stacked display. The operator enters the number of the sheet in the stack of sheets shown in the print preview screen that is to be displayed on the top of the stack, i.e., first in the stack, in the top sheet input area 101. This sheet is referred to as the top sheet below. The operator likewise enters the number of the sheet in the stack of sheets shown in the print preview screen that is to be displayed on the bottom of the stack, i.e., last in the stack, in the bottom sheet input area 102. This sheet is referred to as the bottom sheet below. The operator enters the offset distance between the edges of adjacent sheets in the stack in the offset distance input area 103. The stacked sheet numbers and offset distance are together referred to below as the "display parameters."

Figure 1:
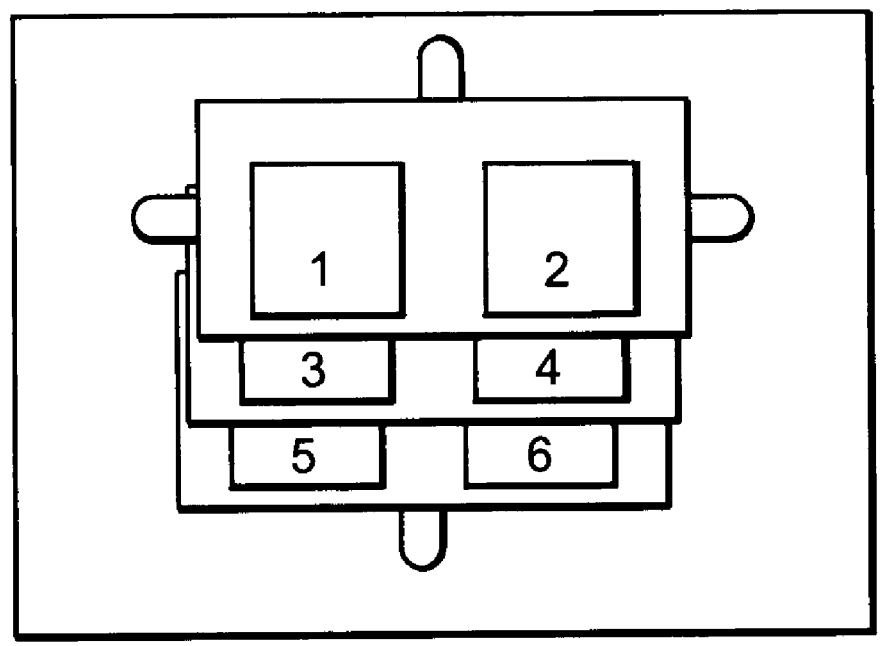
FIG. 1 shows a stacked display in a first embodiment of the present invention.

FIG. 4 shows an example in which the first to third sheets are to be displayed stacked with a 10 mm offset between the edges of the sheets. Entering the display parameters shown in FIG. 4 presents a print preview screen such as shown in FIG. 1. As shown in FIG. 1, the first to third sheets are displayed with the sheets offset vertically on screen.

1.3 Display Process

Figure 5:
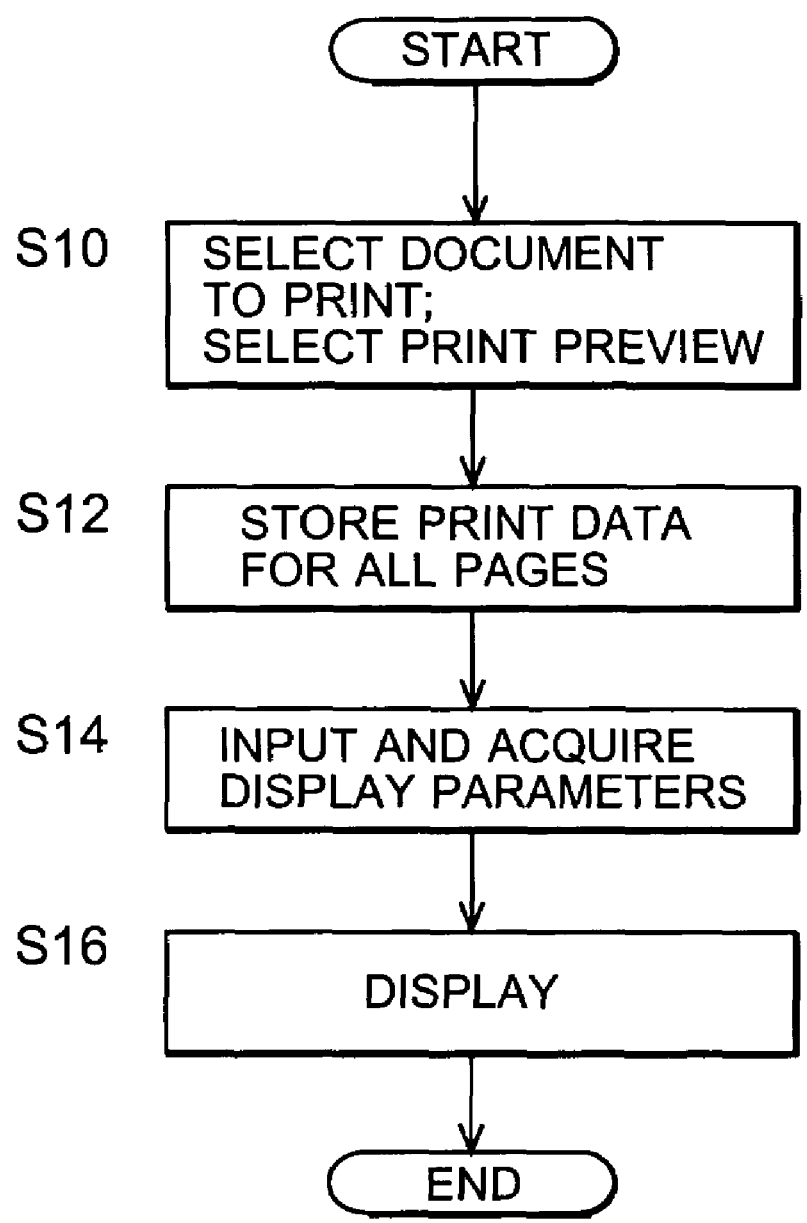
FIG. 5 is a flowchart of the general process executed for a print preview in the first embodiment of the present invention.

The display process run by the CPU when a print preview is selected by the operator is described next. FIG. 5 is a flowchart of the process run when a print preview is selected.

The operator first selects the document to print and sets the printing parameters (step S10). The printing parameters include the first and last pages to be printed, and how many pages are printed on one sheet of paper and so on. The CPU stores these settings in parameter storage portion 73.

The CPU also stores bitmap print data in the print data storage device 20 based on the stored settings (step S12).

The operator then selects the print preview. The print preview screen is thus presented on the display screen, and the operator then clicks one of the stacking buttons. The CPU presents the display parameter input screen on the display screen. After the operator enters the display parameters, the CPU reads the display parameters (step S14) and starts the stacked display process (step S16).

Figure 6:
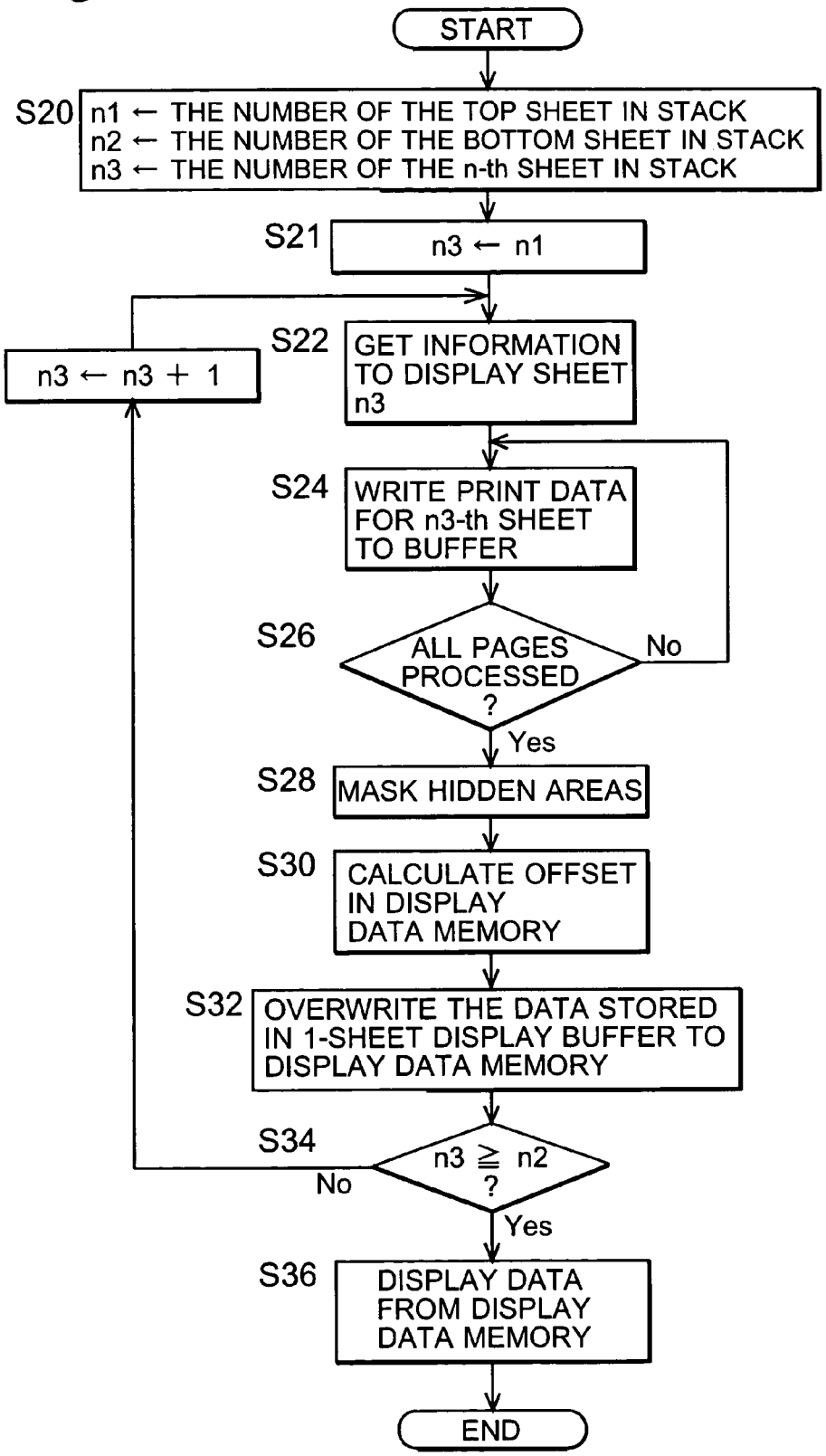
FIG. 6 is a flowchart of the stacked display process run by the CPU in the first embodiment of the present invention.

FIG. 6 is a flowchart showing the stacked display process in detail. CPU operation when running this process is described with reference to FIG. 6 below. Note that basic print document parameters as shown in FIG. 7 are stored in the print data storage device 20 in advance.

When the display parameters entered by the operator are read, the CPU stores the number of the top sheet to parameter n1, the number of the bottom sheet to parameter n2, and the number of the n-th stacked sheet counter to parameter n3 (step S20). Parameter n1 is then written to parameter n3 (step S21). Note that parameter n3 denotes the sequential number in the stack of the sheet being processed by the CPU.

The page numbers included on the n3-th sheet, and the offset indicating the placement on the sheet of the content of each page, are then acquired from the basic print document parameters as shown in FIG. 7 (step S22).

When the information for each page on the n3-th sheet is thus acquired, the data for each page on the n3-th sheet is read from print data storage device 20 and written to 1-sheet display buffer 30 (step S24).

When writing data for one page to 1-sheet display buffer 30 is completed, whether data for all pages contained on the n3-th sheet has been written to 1-sheet display buffer 30 is determined. If data for all pages has been written to 1-sheet display buffer 30, the procedure advances to step S28. If there is a page that has not been written to 1-sheet display buffer 30, the procedure returns to step S24 (step S26).

In other words, when multiple pages are printed on one sheet of paper, steps S24 and S26 repeat until the data for all pages contained on that sheet has been read from print data storage device 20 and written to 1-sheet display buffer 30.

If it is determined in step S26 that data for all pages on the n3-th sheet has been written to 1-sheet display buffer 30, a process for not displaying data on the sheets displayed behind another sheet is applied to the overlapping parts of the multiple sheets in the print preview. This process is called a "masking process" below.

Before the masking process starts all data for each page contained in these sheets is stored in the 1-sheet display buffer 30. The masking process then deletes the data for the areas not displayed from the 1-sheet display buffer 30.

Figure 8:
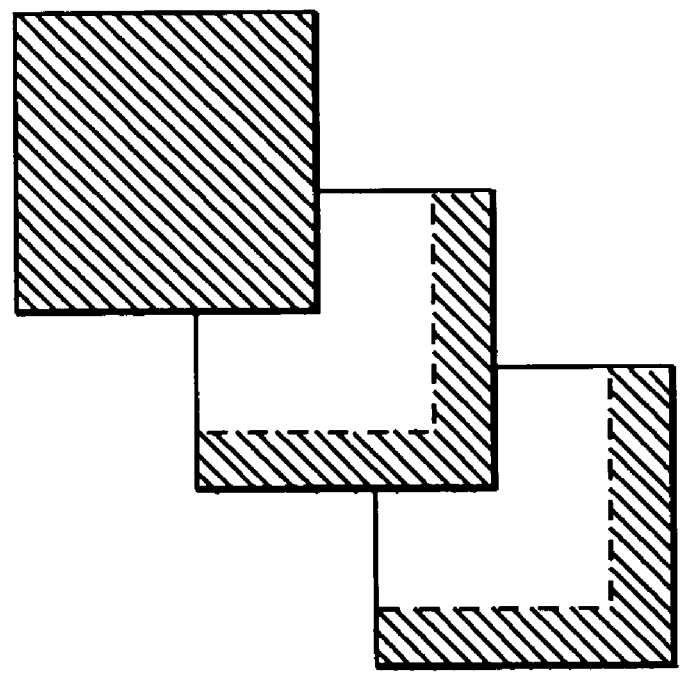
FIG. 8 illustrates a masking process in the first embodiment of the present invention.

FIG. 8 schematically shows this masking process. In this example the sheets are stacked offset to the bottom right. Data for the shaded part of each sheet is left in 1-sheet display buffer 30, and data for the other part of each sheet is erased from 1-sheet display buffer 30 (step S28).

When the masking process ends the offset from the reference position of the data storage area in display data memory 40 is calculated by the XY address calculator 72 using the following equations (1), (2), (3), and (4) (step S30). This offset corresponds to the display area of data on the n3-th sheet on the display screen.

Figure 9:
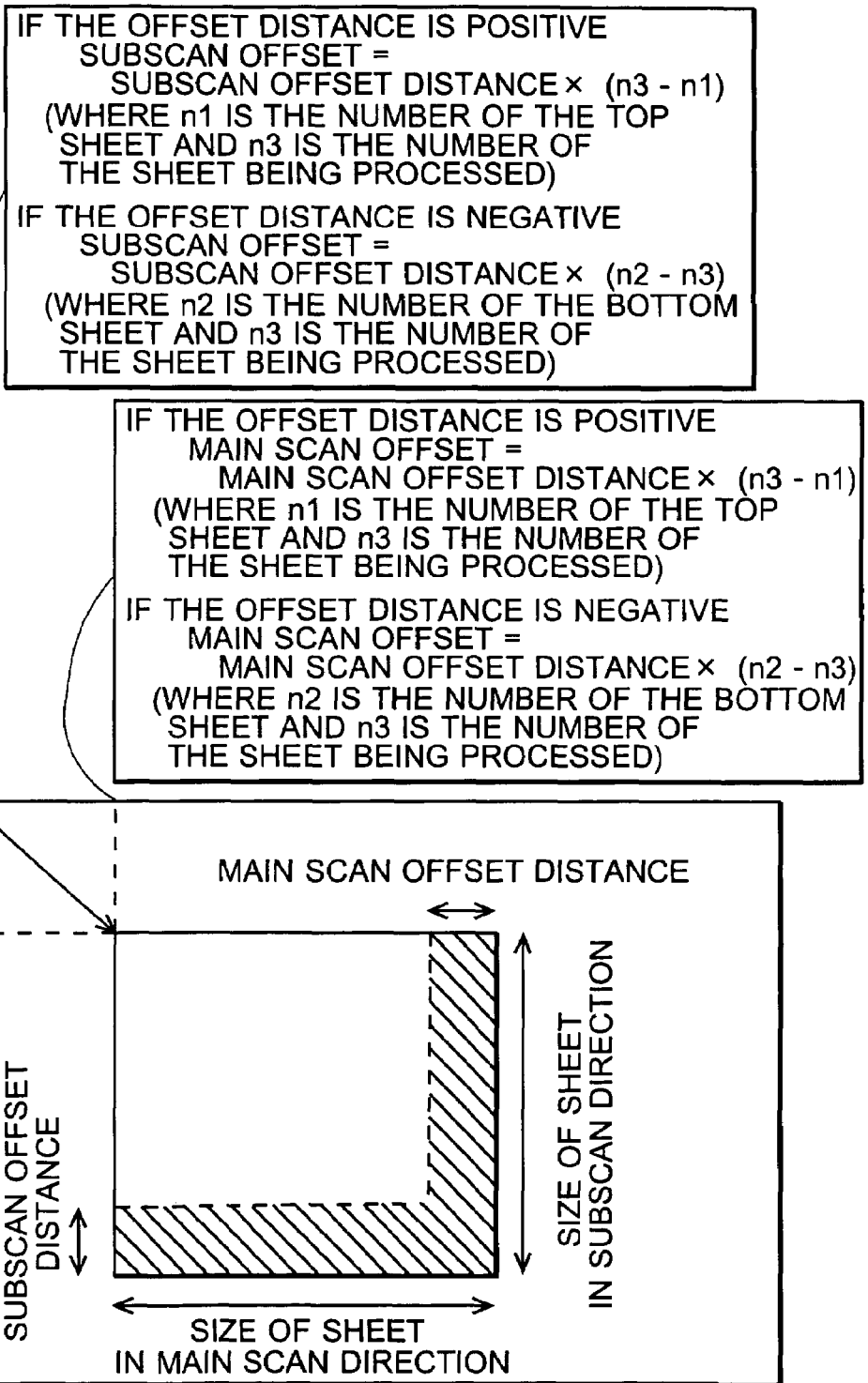
FIG. 9 schematically describes a method of calculating the offset values in the display data memory in the first embodiment of the present invention.

FIG. 9 schematically illustrates calculating this offset in display data memory 40.

If the offset is positive $$\text{main scan offset} = \text{main scan offset distance} \times (n3-n1) \quad (1)$$

$$\text{subscan offset} = \text{subscan offset distance} \times (n3-n1) \quad (2)$$

If the offset is negative $$\text{main scan offset} = \text{main scan offset distance} \times (n2-n3) \quad (3)$$

$$\text{subscan offset} = \text{subscan offset distance} \times (n2-n3) \quad (4)$$

Note that the main scan offset in equation (1) is the offset from the reference position where a shift to the right is positive. The main scan offset distance is the distance between the edges of the displayed sheets where a shift to the right is positive. This main scan offset distance corresponds to the offset distance entered by the operator in the display parameter input screen presented after the operator clicks the stacking button that are on the right or left side of the sheets shown in the print preview screen.

The subscan offset in equation (2) is the offset from the reference position where a downward shift is positive. The subscan offset distance is the distance between the edges of the displayed sheets where a downward shift is positive. This subscan offset distance corresponds to the offset distance entered by the operator in the display parameter input screen presented after the operator clicks the stacking button that are on the top or bottom side of the sheets shown in the print preview screen.

Figure 10:
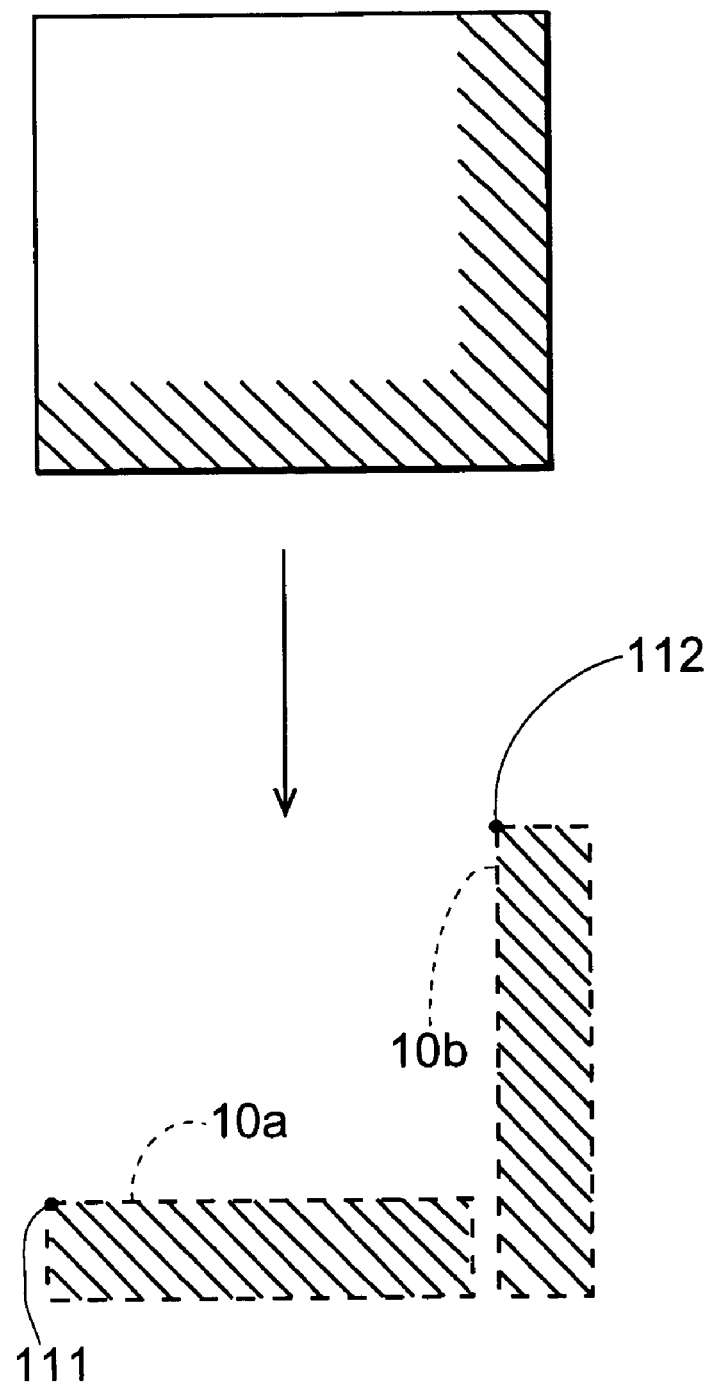
FIG. 10 schematically illustrates dividing data in the 1-sheet display buffer into data for two rectangles in the first embodiment of the present invention.

Once the offset from the reference position of the data storage area in display data memory 40 is thus obtained, the data stored in 1-sheet display buffer 30 is transferred to display data memory 40 based on this offset (step S32). If the sheets are displayed offset both vertically and horizontally, the area displayed for each offset sheet is composed of two rectangular areas. FIG. 10 schematically shows dividing the data in 1-sheet display buffer 30 into data for two rectangular areas. As shown in FIG. 10, the data stored in 1-sheet display buffer 30 is divided into the data for two areas labelled 10*a* and 10*b*, and the data for these two areas is sent to the display data memory 40. In FIG. 10, the reference numeral 111 denotes the upper-left of the area 10*a* and the reference numeral 112 denotes the upper-left of the area 10*b*. If subscan offset of point 111 from the reference position is denoted by reference character SUBoff, SUBoff is calculated by using the following equation:

$$\text{SUBoff} = \text{VAL\_Soff} + \text{S\_height} + \text{SUBBoff\_dist}$$

where VAL_Soff denotes the value obtained by using the equation (2) or (4), S_height denotes the sheet height, and SUBoff_dist denotes the subscan offset distance.

If main scan offset of point 112 from the reference position is denoted by reference character MAINoff, MAINoff is calculated by using the following equation:

$$\text{MAINoff} = \text{VAL\_Moff} + \text{S\_length} + \text{MAINoff\_dist}$$

where VAL_Moff denotes the value obtained by using the equation (1) or (3), S_length denotes the sheet length, and MAINoff_dist denotes the main scan offset distance.

When data transfer from 1-sheet display buffer 30 to display data memory 40 is completed, the CPU determines whether the process from step S22 to step S32 has been completed for all of the sheets presented in the print preview screen. If all sheets have been processed, the procedure advances to step S36. If all sheets have not been processed, parameter n3 is increased by 1 and the procedure returns to step S22 (step S34).

If the CPU determines as a result of step S34 that all sheets have been processed by steps S22 to S32, the content of the data stored in display data memory 40 is presented on the screen of display device 50 (step S36). This print preview screen shows the stacked display based on the settings in the display parameter input screen.

It should be noted that data for areas not displayed is erased from 1-sheet display buffer 30 in step S28 and the data left in the 1-sheet display buffer 30 is transferred to display data memory 40 in step S32 in this embodiment, but the present invention shall not be so limited. More specifically, it is also possible to transfer only the data for the displayed areas from the 1-sheet display buffer 30 to the display data memory 40 in step S32 instead of data erasing process in step S28.

Furthermore, the display parameter input screen is presented when a stacking button is clicked in the print preview screen, but the display parameter input screen could be presented for the operator to set the display parameters before the print preview screen is displayed. In this case, when the operator clicks the stacking button, the print preview screen shows the stacked display based on the set display parameters without presenting the display parameter input screen.

Furthermore, the data in the 1-sheet display buffer 30 is divided into the data for two rectangular areas and sent to the display data memory 40 in step S32 above, but this invention shall not be so limited. More specifically, the data left in the 1-sheet display buffer 40 after deleting the data for the areas not displayed could be sent directly to the display data memory 40. Calculating the address for dividing the data in the 1-sheet display buffer 30 into the data for two rectangles is unnecessary in this case, but the amount of transferred data increases. Furthermore, data must be combined with data already written to display data memory 40 by an OR operation. This is further described with reference to FIG. 11.

It should be noted that when data for multiple sheets is sent to the display data memory 40, only the data for the displayed areas of each sheet are combined by OR operation. If an OR operation is not applied, transferred data simply overwrites any data previously stored in the display data memory 40.

Figure 11:
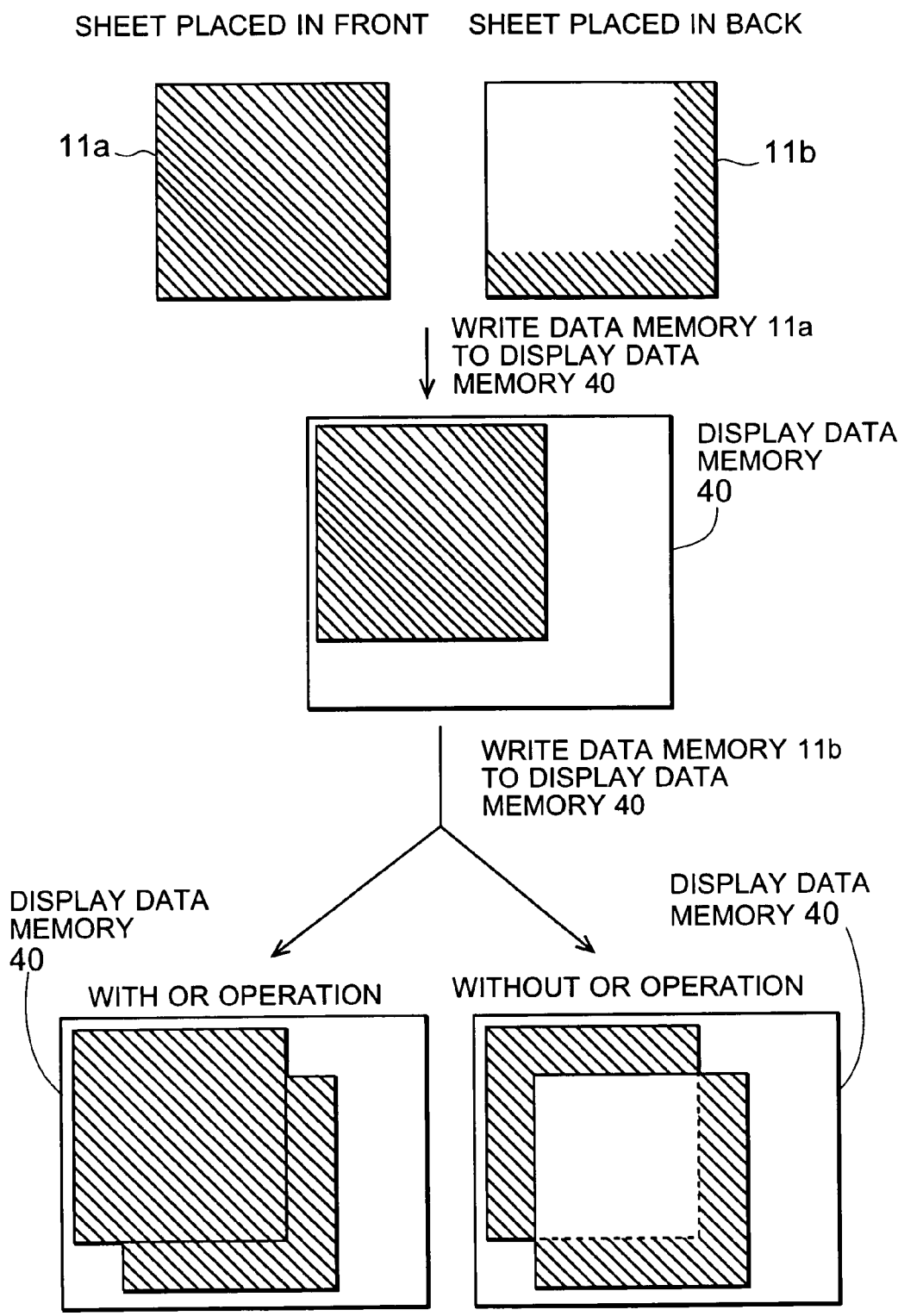
FIG. 11 illustrates an OR operation applied when transferring data from the 1-sheet display buffer to the display data memory in the first embodiment of the present invention.

FIG. 11 describes an OR operation for merging data from the 1-sheet display buffer 30 with data stored in the display data memory 40. This example assumes that two sheets are displayed on screen with one sheet offset to the right and downward from the other sheet. Data 11a for the sheet displayed in the forefront, that is, on top, is first transferred from the 1-sheet display buffer 30 to display data memory 40. The data 11b for the sheet displayed behind (below) the first sheet is then sent from the 1-sheet display buffer 30 to display data memory 40. If the OR operation is not applied, data previously written to display data memory 40 will be overwritten by the data in the white part of area 11b, that is, the area that is not displayed. The sheets will therefore not be displayed as desired in the print preview screen. However, if the OR opertion is applied, the data already written to display data memory 40 will be combined only with the data for the shaded part of area 11b, that is, the desired display area. The sheets will therefore be displayed as desired in the print preview screen.

1.4 Advantageous Effect

This embodiment of the invention provides a print preview screen in which multiple sheets can be viewed offset parallel to each other based on operator-defined settings when there are plural sheets to print. This enables multiple sheets to be easily compared in a print preview screen to check the print layout in specific areas of the sheets to, for example, confirm the position of page numbers or the margin size. This also reduces the need to output hard copy samples from the printer in order to confirm the print layout, thereby also reducing the time and cost needed to confirm the print layout.

2. Second Embodiment

The digital printer controller according to a second embodiment of the present invention is described next. The general configuration of this embodiment is the same as that of the first embodiment shown in FIG. 2. This embodiment differs from the first embodiment in having "front" and "back" buttons in the print preview screen. The operator can also click with a mouse on any of the sheets shown in the print preview screen. The processes run by the CPU also do not include the masking process described above.

2.1 Imposition Printing

Figure 12:
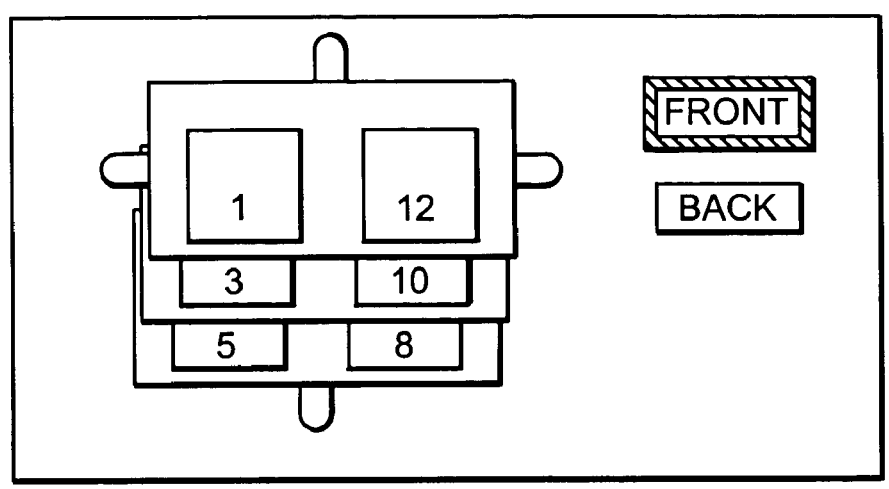
FIG. 12 shows a print preview screen in a second embodiment of the present invention.

FIG. 12 shows a print preview screen according to this embodiment of the invention. As noted above, this print preview screen has a front button and a back button. Imposition printing done with a digital printer is described next. When multiple pages are printed on a single sheet by a digital printer, the pages printed on each sheet will not necessarily be consecutively numbered. Depending on the page, printing may be oriented in different directions, such as inverted top and bottom. This is described more specifically with reference to a 16-page document printed on two sheets of paper with four pages each printed on the back and front of each of the two sheets. FIG. 13 shows an example of this imposition. The page numbers and orientation of each printed page are indicated by the numbers shown in FIG. 13.

In this embodiment, front and back buttons are provided in the print preview screen so that the pages printed on the back of each sheet can be previewed as well as the pages printed on the front of each sheet. For example, if the back button is clicked when the front of sheet 1 and the front of sheet 2 are shown on screen, it changes the display to show the back of sheet 1 and the back of sheet 2.

2.2 Display Process

CPU operation when the operator selects the print preview is described next. The overall process is the same as described in the first embodiment with reference to FIG. 5 and further description thereof is omitted below while describing the stacked display process in detail.

Figure 14:
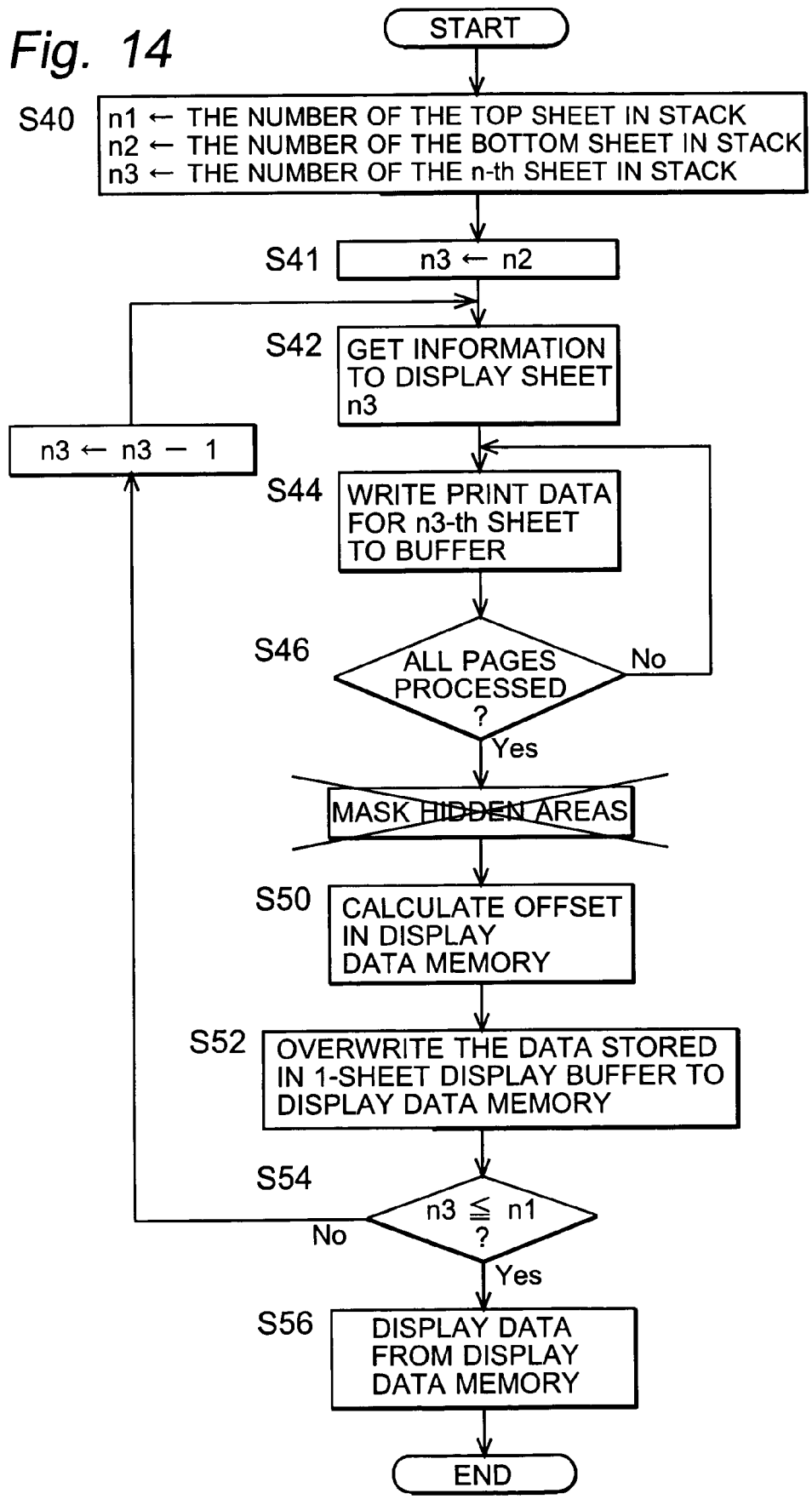
FIG. 14 is a flowchart of the stacked display process run by the CPU in the second embodiment of the present invention.

FIG. 14 is a flowchart showing the stacked display process run by the CPU in detail.

As in the first embodiment, when the display parameters entered by the operator are read, the CPU stores the number of the top sheet to parameter n1, the number of the bottom sheet to parameter n2, and the number of the n-th stacked sheet counter to parameter n3 (step S40). Parameter n2 is then written to parameter n3 (step S41).

The page numbers included on selected side (front or back) of the n3-th sheet, and the offset indicating the placement on the sheet of the content of each page, are then acquired from the basic print document parameters as shown in FIG. 15 (step S42). In this embodiment, there is the distinction between the front and back of each sheet in the basic print document parameters so that the either front or back sides of each sheet can be previewed.

When the information for each page on the n3-th sheet is thus acquired, the data for each page on the n3-th sheet is written to 1-sheet display buffer 30 (step S44) as in step S24 in FIG. 6.

When writing data for one page to 1-sheet display buffer 30 is completed, whether data for all pages contained on the n3-th sheet has been written to 1-sheet display buffer 30 is determined as in step S26 in FIG. 6 (step S46).

A masking process is run next in the first embodiment, but is not run in the present embodiment. In this embodiment, data transfer from the 1-sheet display buffer 30 to the display data memory 40 proceeds sequentially from the farthest background sheet, that is, the bottom sheet of the stack, to the foreground sheet at the top of the stack with the data for each sheet simply overwriting the data already stored in display data memory 40. Data for the undisplayed area of each sheet is thus simply overwritten in the display data memory 40, and is therefore not displayed on screen.

As in step S30 in FIG. 6, the offset in the display data memory 40 is calculated next (step S50). Once the offset in display data memory 40 is obtained, the data stored in 1-sheet display buffer 30 is transferred to display data memory 40 as in step S32 in FIG. 6 (step S52). Note that data in the display data memory 40 is overwritten at this time.

When data transfer from 1-sheet display buffer 30 to display data memory 40 is completed, the CPU determines whether the process from step S42 to step S52 has been completed for all of the sheets presented in the print preview screen. If all of the sheets have been processed, the procedure advances to step S56. If all of the sheets have not been processed, parameter n3 is decreased by 1 and the procedure returns to step S42 (step S54).

If the CPU determines as a result of step S54 that all sheets have been processed by steps S42 to S52, the data stored in display data memory 40 is presented on the screen of display device 50 as in step S36 in FIG. 6 (step S56).

2.3 Displaying a Desired Sheet in the Foreground (Top)

Figure 16:
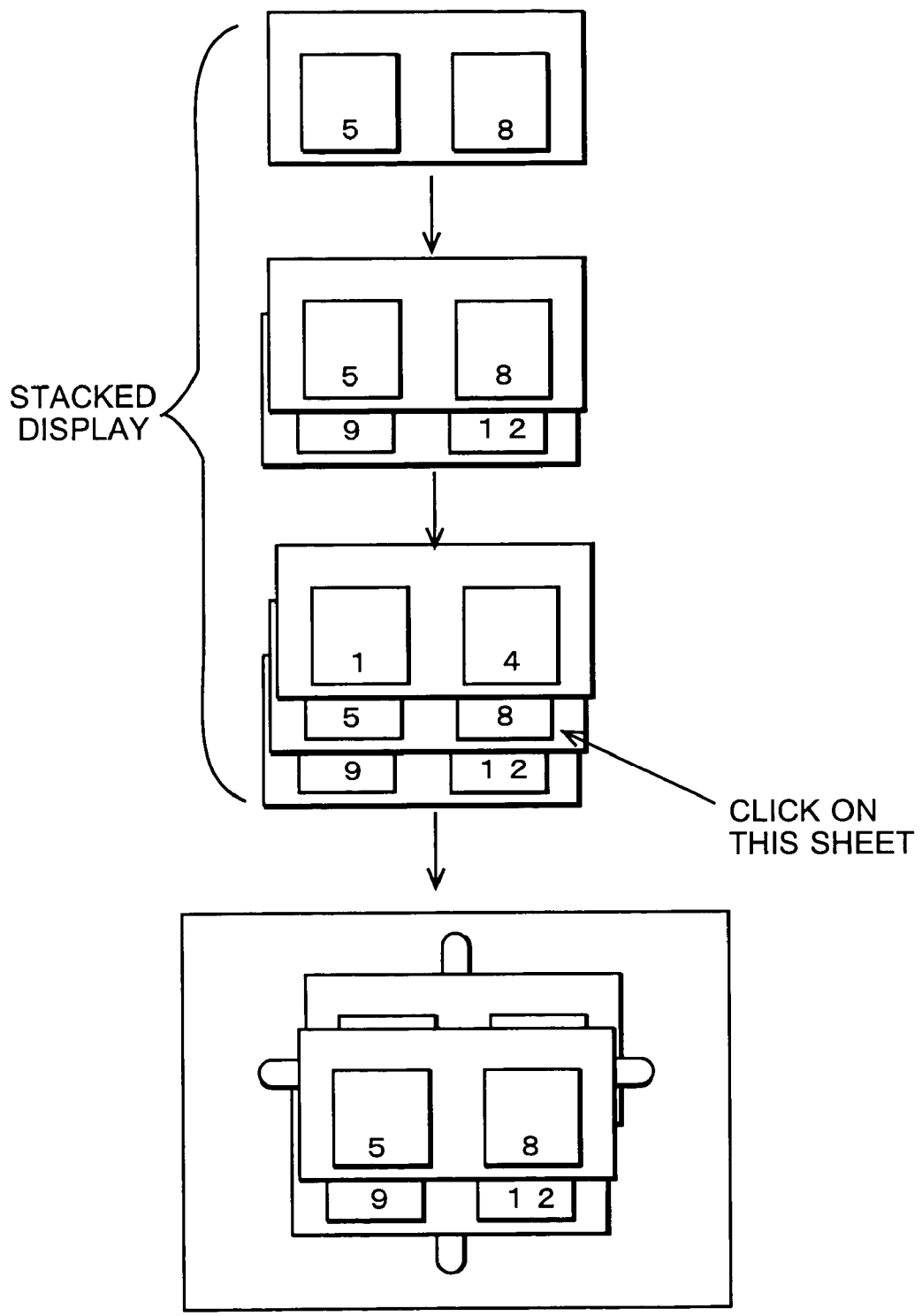
FIG. 16 schematically shows displaying in the foreground a sheet clicked on by the operator after multiple sheets are displayed stacked in the second embodiment of the present invention.

In this embodiment, the operator can also click on a desired sheet in the print preview screen. When the operator clicks on any sheet, the clicked sheet is brought to the top of the stack, that is, to the foreground of the display. FIG. 16 schematically shows displaying in the foreground a sheet clicked on by the operator after multiple sheets are displayed stacked. In this case the CPU does not need to read the data for all sheets again from the print data storage device 20. Instead, the CPU reads from print data storage device 20 only the data for the clicked sheet, and then overwrites the read data to display data memory 40.

2.4 Advantageous Effect

This embodiment of the present invention enables the operator to display any desired sheet in the foreground in front of all other sheets in the print preview screen. When printing impositons, the operator can also view the result of printing the backed up side of each sheet in the print preview screen. Multiple sheets can therefore be easily compared as in the first embodiment, and views of both sides of a imposition printing can also be presented.

3. Variations

Figure 17:
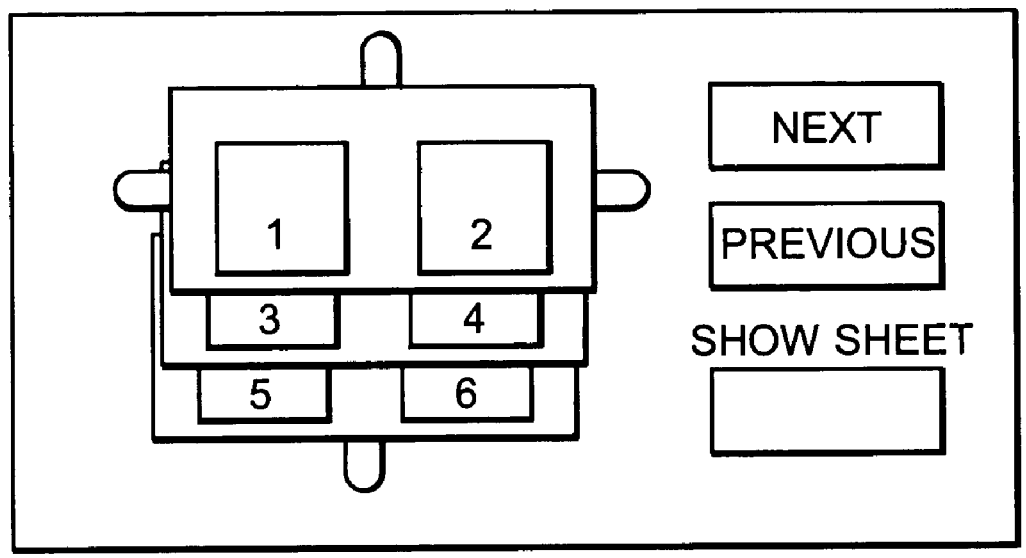
FIG. 17 shows a print preview screen according to a variation of the second embodiment of the present invention.

FIG. 17 shows a print preview screen according to a variation of the second embodiment. This print preview screen has "next" and "previous" buttons and a data input box. When the operator clicks the next or previous button, or inputs a value for the n-th sheet in the data input box, the CPU does not need to again read data for all sheets from the print data storage device 20. As when the operator clicks on a desired sheet in the second embodiment, only the data for the sheet to be displayed on top in the foreground is read from print data storage device 20 and overwritten to the data in the display data memory 40. As a result, when the user clicks the next button, the sheet next after the sheet currently displayed in the foreground is displayed on top. Likewise when the operator clicks on the previous button, the sheet sequentially before the sheet currently displayed in the foreground is displayed on top. Likewise when the operator enters a numeric value in the data input box, the n-th sheet (where n=the input value) is displayed on top.

In this embodiment, the operator can easily change the sheet displayed on top of the other sheets. The operator can also numerically specify the sequence number of the particular sheet which is displayed on top. This enables displaying on the top of the stack a sheet that is behind other sheets and cannot be seen or cannot be clicked on.

4. Embodiment as a Program

These embodiments of the present invention have described print preview screens as screens displayed on the display device of the digital printer controller, but this invention shall not be so limited. As noted above, the display process of this controller can be implemented by running programs executed by a CPU. For example, transferring data from the 1-sheet display buffer 30 to the display data memory 40 (step S32, FIG. 6), and displaying data from the display data memory 40 on the display device 50 (step S36, FIG. 6), are done based on specific programs assuming the presence of specific hardware such as the display data memory 40 and the display device 50. In other words, the steps for presenting these print preview screens can be provided as a program run by a computer.

Furthermore, the methods for displaying print preview screens as described above can also be applied to print result display methods used by devices other than digital printer controllers.

Using various parameters set by the operator in the display parameter input screen enables the stacked displays of various types.

While the invention has been described in detail, the foregoing description is in all aspects illustrative and not restrictive. It is understood that numerous other modifications and variations can be devised without departing from the scope of the invention.

This application claims priority based on a "print preview apparatus and method" taught in Japanese patent application 2003-083530, filed on Mar. 25, 2003, hereby incorporated by reference.

I claim:

1. An apparatus for print preview which presents printout before printing by a digital printer, comprising:
   a print setting portion for setting a first page to be printed, a last page to be printed, and the number of pages to be printed on one sheet;
   a display portion;
   a display data storage portion for storing display data representing content to be displayed on the display portion;
   a print data storage portion for storing print data for a plurality of pages to be printed by the digital printer;
   a one-sheet data storage portion for storing display data for one sheet; and
   a display control portion for transferring and storing print data corresponding to the printout to be displayed as the print preview from the print data storage portion to the display data storage portion via the one-sheet data storage portion, and thereby presenting the printout on the display portion;
   wherein the display control portion transfers and stores print data for more than two pages from the print data storage portion to the one-sheet data storage portion as the display data for one sheet, based on a print setting set by the print setting portion;

wherein the display control portion transfers and stores the display data successively stored to the one-sheet data storage portion to the display data storage portion while offsetting the storage address for each sheet of display data, while preventing transfer of display data associated with the part of the print data corresponding to an area located behind another sheet as a result of stacking a plurality of sheets out of the print data for a plurality of pages; and the display portion presents printout for the plurality of sheets in parallel offset positions sheet by sheet based on the display data stored in the display data storage portion by the display control portion.

2. An apparatus as described in claim 1, further comprising a first input operation portion for receiving input specifying one or multiple sheets to be presented in an offset display on the display portion;

a second input operation portion for receiving input specifying an offset distance for the sheets to be presented in the offset display; and a third input operation portion for receiving input specifying an offset direction for the sheets to be presented in the offset display;

wherein the display control portion stores display data corresponding to the printout of the one or multiple sheets in the display data storage portion while shifting the data storage address of each sheet based on the offset distance and offset direction set according to the input received by the first input operation portion, second input operation portion, and third input operation portion; and the display portion displays the printout of the one or multiple sheets in a stacked arrangement with each sheet shifted the offset distance in the offset direction according to the input received by the first input operation portion, second input operation portion, and third input operation portion.

3. An apparatus as described in claim 1, further comprising a fourth input operation portion for receiving input specifying a sheet to be presented in the foreground on the display portion;

wherein, when input specifying the sheet to be presented in the foreground is received, the display control portion overwrites display data corresponding to the printout of the specified sheet in the display data storage; and the display portion presents the specified sheet in the foreground.

4. A printout display method of an apparatus for print preview and having a print setting portion for setting a first page to be printed, a last page to be printed, and the number of pages to be printed on one sheet; a display portion, a display data storage portion for storing display data representing content to be displayed on the display portion, a print data storage portion for storing print data for a plurality of pages, and a one-sheet data storage portion for storing display data for one sheet, the printout display method comprising:

a storage address calculating step of calculating an offset storage address in the display data storage portion for each sheet of display data for a plurality of sheets where the print data corresponds to the printout to be displayed as the print preview;

a data transfer step of transferring and storing data stored in the print data storage portion to the display data storage portion via the one-sheet data storage portion, the data transfer step including transferring and storing print data for more than two pages from the print data storage portion to the one-sheet data storage portion as the display data for one sheet, based on a print setting set by the print setting portion; and transferring and storing the display data successively stored to the one-sheet data storage portion based on the storage addresses calculated in the storage address calculating step, while preventing transfer of display data associated with the part of the print data corresponding to an area located behind another sheet as a result of stacking the plurality of sheets; and a display step of presenting printout for the plurality of sheets in parallel offset positions sheet by sheet on the display portion based on the display data stored in the display data storage portion in the data transfer step.

5. A printout display method as described in claim 4, further comprising a first input receiving step of receiving input specifying one or multiple sheets to be presented in an offset display in the display step;

a second input receiving step of receiving input specifying an offset distance for the sheets to be presented in the offset display; and a third input receiving step of receiving input specifying an offset direction for the sheets to be presented in the offset display;

wherein, in the data transfer step, the display data corresponding to the printout of the one or multiple sheets is stored in the display data storage portion while the data storage address of each sheet is shifted based on the offset distance and offset direction set according to the input received in the first input receiving step, second input receiving step, and third input receiving step; and in the display step, the printout of the one or multiple sheets is displayed in a stacked arrangement with each sheet shifted the offset distance in the offset direction according to the input received in the first input receiving step, second input receiving step, and third input receiving step.

6. A printout display method as described in claim 4, further comprising a step of receiving input specifying a sheet to be presented in the foreground in the display step;

wherein, when input specifying the sheet to be presented in the foreground is received, display data corresponding to the printout of the specified sheet is overwritten in the data transfer step; and the specified sheet is presented in the foreground in the display step.

7. A computer-readable recording medium bearing a printout display program for displaying printout in an apparatus for print preview, the apparatus having a print setting portion for setting a first page to be printed, a last page to be printed, and the number of pages to be printed on one sheet; a display portion, a display data storage portion for storing display data representing content to be displayed on the display portion, a print data storage portion for storing print data for a plurality of pages, and a one-sheet data storage portion for storing display data for one sheet, the printout display program, when executed by a computer, causing the computer to perform:

a storage address calculating step of calculating an offset storage address in the display data storage portion for each sheet of display data for a plurality of sheets where the print data corresponds to the printout to be displayed as the print preview;

a data transfer step of transferring and storing data stored in the print data storage portion to the display data storage portion via the one-sheet data storage portion, the data transfer step including transferring and storing print data for more than two pages from the print data storage portion to the one-sheet data storage portion as the display data for one sheet, based on a print setting set by the print setting portion; and transferring and storing the display data successively stored to the one-sheet data storage portion based on the storage addresses calculated in the storage address calculating step, while preventing transfer of display data associated with the part of the print data corresponding to an area located behind another sheet as a result of stacking the plurality of sheets; and a display step of presenting printout for the plurality of sheets in parallel offset positions sheet by sheet on the display portion based on the display data stored in the display data storage portion in the data transfer step.

8. The computer-readable recording medium as described in claim 7, when executed by a computer, causing the computer to further perform:

a first input receiving step of receiving input specifying one or multiple sheets to be presented in the offset display in the display step;

a second input receiving step of receiving input specifying an offset distance for the sheets to be presented in the offset display; and a third input receiving step of receiving input specifying an offset direction for the sheets to be presented in the offset display;

wherein, in the data transfer step, the display data corresponding to the printout of the one or multiple sheets is stored in the display data storage portion while the data storage address of each sheet is shifted based on the offset distance and offset direction set according to the input received in the first input receiving step, second input receiving step, and third input receiving step; and in the display step, the printout of the one or multiple sheets is displayed in a stacked arrangement with each sheet shifted the offset distance in the offset direction according to the input received in the first input receiving step, second input receiving step, and third input receiving step.

9. The computer-readable recording medium as described in claim 7, when executed by a computer, causing the computer to further perform:

a step of receiving input specifying a sheet to be presented in the foreground in the display step;

wherein, when input specifying the sheet to be presented in the foreground is received, display data corresponding to the printout of the specified sheet is overwritten in the data transfer step; and the specified sheet is presented in the foreground in the display step.

* * * * *